United States Patent [19]
Kemper

[11] 3,733,683
[45] May 22, 1973

[54] METHOD OF MANUFACTURING AN EXPANSION ELEMENT

[76] Inventor: Johannes A. Kemper, c/o N. V. Machinefabrie "Arnhem", Industriestraat 9, Arnhem, Netherlands

[22] Filed: May 12, 1971

[21] Appl. No.: 142,735

[30] Foreign Application Priority Data

May 12, 1970 Netherlands ..................7006873

[52] U.S. Cl...................................29/471.1, 29/482
[51] Int. Cl. .............................................B23k 31/02
[58] Field of Search.....................29/471.1, 475, 482, 29/483, 500, 501, 502

[56] References Cited

UNITED STATES PATENTS 2,787,699   4/1957   Jessen..............................29/471.1 X
3,248,134   4/1966   Pennington......................29/471.1 X
3,286,341   11/1966  Miller................................29/471.1
3,525,144   8/1970   Katunich et al. ....................29/471.1

*Primary Examiner*—J. Spencer Overholser
*Assistant Examiner*—Richard Bernard Lazarus
*Attorney*—Paul & Paul

[57]  ABSTRACT

Expansion element consisting of a corrugated stainless steel pipe welded to stubs of normal steel, the said weld being made by depositing stainless steel as a welding material onto end surfaces of the stubs, milling the deposited material for forming a substantially radial and a substantially cylindrical surface intersecting each other and welding the corrugated pipe to said surface.

3 Claims, 4 Drawing Figures

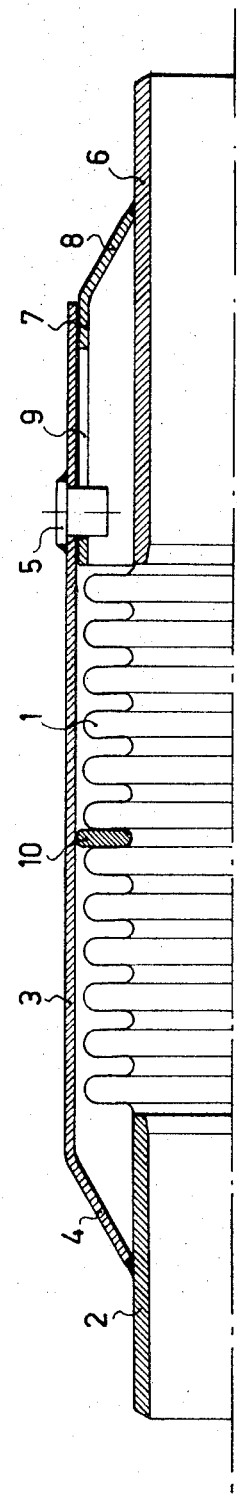

METHOD OF MANUFACTURING AN EXPANSION ELEMENT

The invention relates to an expansion element, provided with a corrugated pipe of thin stainless steel, which has on both sides been connected with a pipe stub of steel. According to a known process the attachment of such corrugated pipes to the pipe stub takes place by means of brazing. In practice it has been proven, that owing to this, relatively substantial leakage has occurred. The brazed joint was namely not always reliable and could show leakage. A further cause of leakage was, that during the welding of the pipe stubs to other pieces of pipes the temperature of the brazed joint sometimes became so high, that the joint became weak or separation occurred thereat.

According to a further known process at first a connection portion of stainless steel is welded to the pipe stubs, and then the ends of the corrugated pipe are welded to the said connection portion. With this known process it may happen that the end of the thin corrugated pipe is burned down. Moreover in the practice of this known process it is necessary to mount the welded stainless steel in such a way that tensions due to shrinking caused by the difference in the thermal coefficient of expansion between steel and stainless steel remain limited and are transmitted to the corrugated pipe as little as possible.

The invention aims at solving said difficulties in a simple way.

Accordingly it is provided according to the invention that portions of stainless steel are welded on the surfaces at ends of the pipe stubs, that said portions subsequently are partly milled or removed in such a way that two axially symmetric surfaces intersecting each other are obtained and that the ends of the corrugated pipe are put in abutting relation to said surfaces and are welded to them.

It has appeared that in this way a reliable connection between the ends of the corrugated pipe and the pipe stubs can be effected and reliable results can be obtained with the available welding techniques, such as the so-called micro plasma welding or even with argon arc welding.

In practicing this invention it is possible to make further welds near the connection between the corrugated pipe and the pipe stubs. This possibility is made use of according to a further elaboration of the invention by welding a protecting sleeve to the one pipe stub, said sleeve being capable of sliding along a sleeve welded to the other stub.

Said sleeves which are permanently connected with the pipe stubs not only serve as protection for the expansion element but also serve as a stroke or displacement limitation of the expansionelement because according to a further elaboration of the invention one of the sleeves is provided with one or more abutment members, protruding into one or more longitudinal recesses of the other sleeve.

The said axial symmetric surfaces may form a ring-shaped plane surface perpendicular to the axis of the pipe stub and a cilindrical surface forming a thin tubular coaxial extension of the pipe stub.

Preferably a flange is formed at the end of the corrugated pipe, said flange being put against the outer plane of the said radial ring which has been welded to the pipe stub, so that the thin tubular extension fits closely in the end of the corrugated pipe, after which the radial ring and flange and the tubular extension and the end of the corrugated pipe are both welded together. Said latter welding joint preferably takes place without supplying material for the welding.

According to a further improvement of the invention it is provided that between the protecting sleeve and the corrugated pipe a spacer or distance ring is mounted, which ring preferably consists of a plurality of ring sectors, e.g. two ring sectors.

In the following the invention is further elucidated with reference to the accompanying drawing, in which:

FIG. 1 shows half a section through an expansion element according to the invention; and FIGS. 2, 3 and 4 elucidate successive stages of the welding.

In the drawing by 1 a corrugated pipe of stainless steel has been indicated. The material of such a corrugated pipe generally is relatively thin, e.g. 0.3 mm. Owing to this it is, however, extremely difficult to weld this material to normal steel. The corrugated pipe has a number of protrusions and recesses, by which extension and shortening is possible with relatively small reaction forces. A pipe stub 2 is welded to the left side of the corrugated pipe, to which stub a protecting sleeve 3 is welded, comprising a long cylindrical portion and a shorter conical portion 4. The protecting sleeve 3 is, just like the pipe stub 2 of construction steel. In the protecting sleeve a pin 5 has been mounted. A pipe stub 6 has been welded to the right side of the corrugated pipe 1 to which stub 6 a sleeve 7 has been attached with a conical portion 8, said sleeve having a slot-shaped recess 9, in which pin 5 fits. Furthermore, a distance ring 10 has been mounted between the sleeve 3 and the corrugated pipe, said ring being preferably divided for an easy mounting and preferably consisting of two half rings. Said distance ring prevents the corrugated pipe from collapsing, which easily can take place when pipe stubs 2 and 6 after being welded to a piping system have not completely been aligned. Such a collapse leads to friction against sleeve 3 when the corrugated pipe expands and shrinks. This easily leads, as experience has shown, to leakage of the corrugated pipe.

In FIGS. 2, 3 and 4 a preferred embodiment for making the weld between a pipe stub, such as 2 and the corrugated pipe 1 has been further elucidated. First a quantity of stainless steel is welded to the end surface 11 of pipe stub 2, as shown in FIG. 2. Said quantity of stainless steel substantially has the shape of a ring 12. Part of said ring is subsequently milled off, in such a way, that a thin radial ring 13 and a tubular portion protruding in the axial direction of stub 2 remain.

In FIG. 4 the same has been indicated on an enlarged scale. At the end of the corrugated pipe 1 a flange 15 has been formed. By shifting portion 1 in FIG. 4 with the flange 15 to the left until the flange abuts the plane 13 and the innerside of corrugated pipe 1 fits over the outer side of the tubular protrusion 14 and then joining the whole construction e.g. by means of micro plasma welding, without material supply, a weld is being formed.

It has appeared that in this way a very reliable welding connection is obtained.

What I claim is:

1. A method for making an extension element by welding the ends of a thin corrugated pipe of stainless steel to pipe stubs of steel, comprising the steps of placing a deposit of stainless steel on an end plane of each of the pipe stubs of steel, then milling off part of each deposit in such a way that two axial symmetric surfaces intersecting each other are obtained in each deposit, then placing the ends of the thin corrugated pipe of stainless steel in fitting relation to one of said surfaces and abutting relation to the other of said surfaces of each of the pipe stubs, and then welding the corrugated pipe to said deposits on said pipe stubs.

2. The method of claim 1, characterized in that, with respect to each pipe stub, both the surfaces obtained by the milling off are mutually perpendicular; the one surface being a cylindrical surface coaxial with the pipe stub and the other surface being a radial surface, perpendicular to the axis of the pipe stub.

3. The method of claim 1, characterized in that at least one end of the corrugated pipe, before being welded to a deposit associated therewith is provided with a radial flange.

* * * * *